Oct. 2, 1951  H. L. HOFFMAN  2,569,566
MACHINE TOOL
Filed July 26, 1948  2 Sheets-Sheet 1
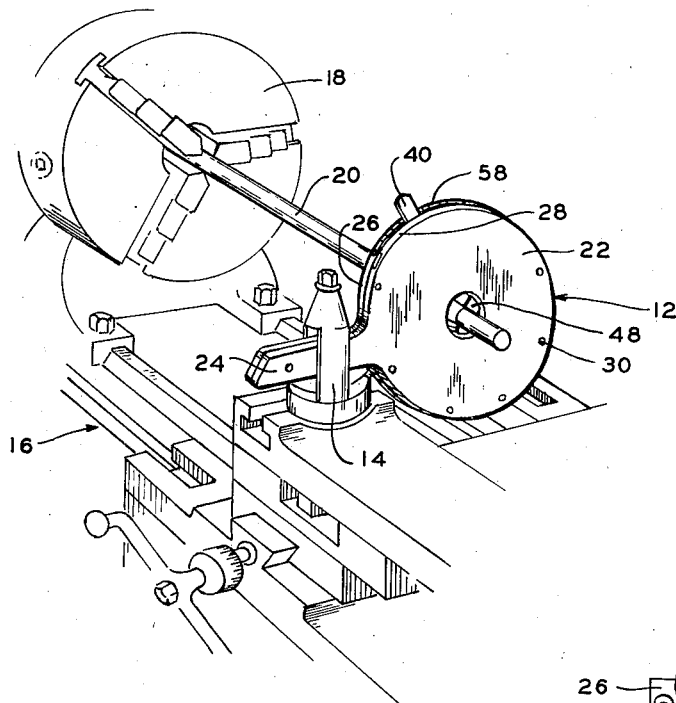
FIG. I.
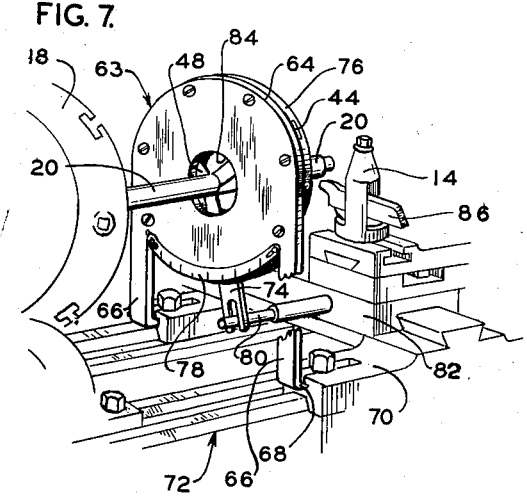
FIG. 7.
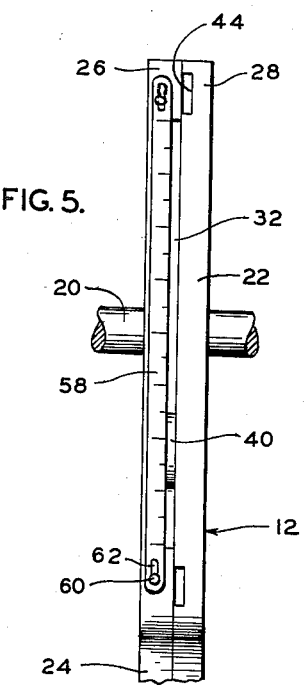
FIG. 5.
INVENTOR.
HAROLD L. HOFFMAN
ATTORNEY Oct. 2, 1951   H. L. HOFFMAN   2,569,566
MACHINE TOOL
Filed July 26, 1948   2 Sheets-Sheet 2
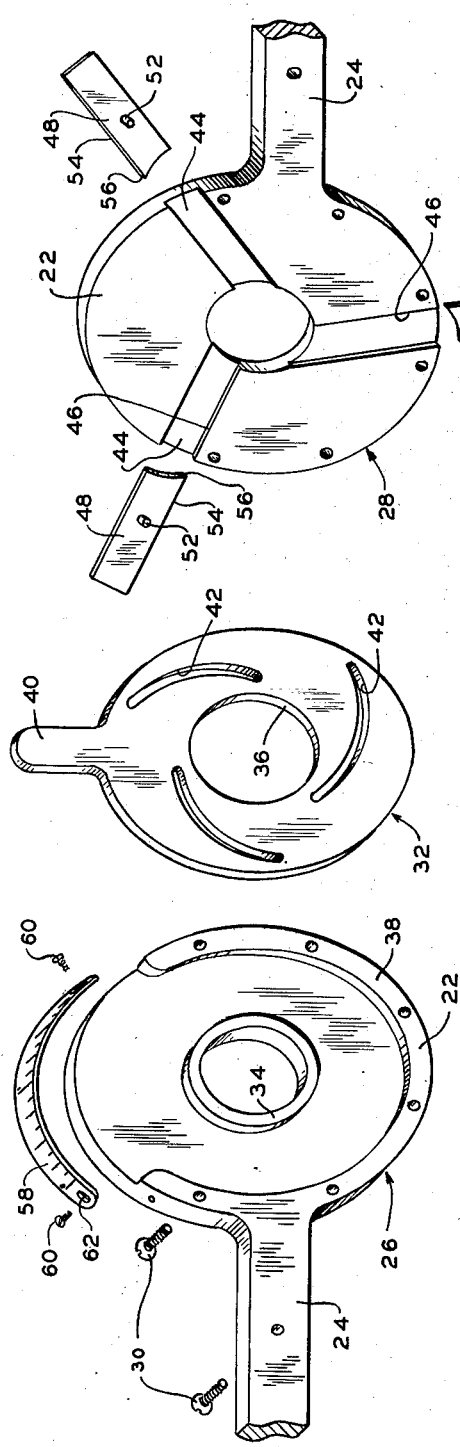
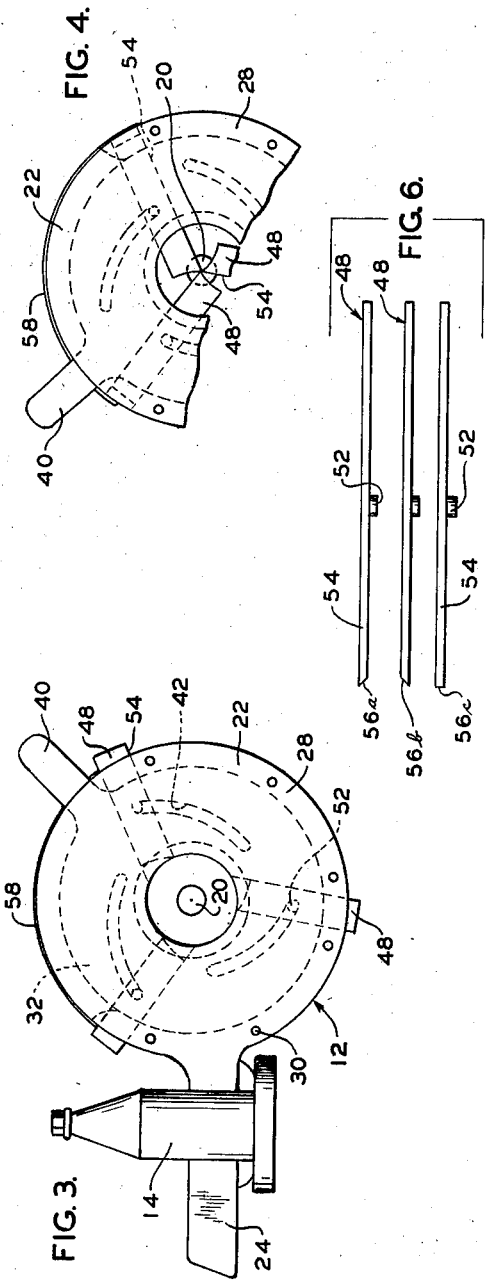
INVENTOR
HAROLD L. HOFFMAN
ATTORNEY Patented Oct. 2, 1951

2,569,566

UNITED STATES PATENT OFFICE 2,569,566

MACHINE TOOL

Harold L. Hoffman, Brielle, N. J.

Application July 26, 1948, Serial No. 40,649

2 Claims. (Cl. 164—60)

This invention relates to machine tools and more particularly to cut-off tools for use with lathes or other machines of a like nature.

In the past, when a piece of material (as a rod, pipe, bar, etc.), being worked on in a lathe, was to be cut off, the usual practice was to first center-drill the free end of the material and hold said end with a center-point in the tail stock. Then a suitable cutting tool was secured in the tool post holder and moved, from one side, into the rotating piece of material, thereby cutting a peripheral groove in the material. As the tool was advanced, the groove was deepened until the material was completely cut off. As but a single cutting tool was used, and this was moved in from but one direction, the material was subjected to a lateral strain which was prone to cause bending thereof. Also, severe vibrations occurred in both the rotating piece of material and the cutting tool, which stressed both of them and also caused rapid wear of the cutting edge of the tool, requiring all too frequent sharpening and replacement thereof.

The difficulties just itemized were particularly noticeable when a piece of material being worked on extended an appreciable distance beyond the chuck of the lathe. In an effort to minimize these difficulties, a steady rest was sometimes used but, even where the nature of the work allowed its use, this required the additional steps of installing and adjusting the same, and it was far from a panacea.

It is therefore an object of the present invention to provide a cut-off device, or the like, which operates without exerting any lateral strain upon a piece of material being worked on and hence cannot break or bend it.

It is another object to provide a cut-off device which completely or substantially eliminates vibration and chatter, and which requires but infrequent sharpening, as compared to previous cut-off tools.

It is a further object to provide such a device wherein the cutting strains are eased by distributing them over a plurality of cutting blades spaced about the periphery of the rotating material (at least three cutting blades being preferred) and by amply supporting the cutting blades at points relatively close to their actual cutting edges.

Another object is to provide a cut-off device which may be incorporated as a permanent part of a lathe or other machine tool, or which may be an accessory or attachment therefor, and which includes a plurality of cutting blades which are moved into the work simultaneously from different angles so that they all cut at the same time and also help to keep the material centered.

Yet another object is to provide such a cut-off device which may incorporate a considerable mechanical advantage, so that a relatively small force is sufficient to operate it.

A still further object is to provide such a cutting device which has cutting blades designed to cut different portions of a cut-off cut, so that they thereby suffer less wear then present day cut-off tools and thus require less frequent sharpening.

Another object is to provide such a device which not only acts to cut off a piece of material but, while so operating, also takes the place of a steady rest for the material and thus obviates the necessity of using a separate steady rest.

A further object is to arrange the parts of a cut-off device so that, at all operating positions of the cutting blades, the force applied to each of said blades is directed primarily in a longitudinal direction and hence is not dissipated in friction.

In general, the present invention is preferably embodied in a device which includes a centrally apertured annular housing which houses a plurality of cutting blades, which are movable, simultaneously, in generally radial directions, toward or away from the axis of the housing. Such simultaneous mechanical movement of the cutting blades is preferably accomplished by means of an annular cam plate, which is coaxially disposed within the housing, and is provided with a plurality of duplicate arcuate slots corresponding to the number of cutting blades, each of said slots having substantially the configuration of a portion of a spiral. Each cutting blade is provided with a cam follower which cooperates with one of the cam slots aforesaid. Upon rotation of the cam plate about its axis the cam followers are caused to follow the spiral conformation of the cam slots and the cutting blades are thereby moved inwardly or outwardly simultaneously. The device is positioned coaxially with a lathe chuck, or other holding means, with the material to be cut off extending through the central aperture of the housing. By rotationally adjusting the cam plate, while the housing is stationary, the cutting blades are advanced inwardly. As the material to be cut off rotates said blades cut an ever deepening peripheral groove about said material until cut-off is accomplished.

In order to better understand the invention, several embodiments thereof are described in greater detail in the following specification and are illustrated in the accompanying drawing in which:

Figure 1 is a perspective view of a cut-off device, incorporating the present invention, which is an accessory to a lathe and is shown during the operation of cutting off a cylindrical shaft;

Figure 2 is an exploded view of the cut-off device of Figure 1, wherein the inner faces of both the base plate and the cover plate are toward the observer, the parts being exaggerated in thickness for clarity;

Figure 3 is an elevational view of the device of Figure 1 with the cutting blades completely retracted;

Figure 4 is a fragmentary view, similar to Figure 3, but showing the cutting blades completely extended, as at the completion of a cut-off operation;

Figure 5 is a top view of the cut-off device of Figure 1;

Figure 6 is an enlarged elevational view of the three cutting blades (of the device of Figure 1) removed from said device and juxtaposed so as to show their cutting edges in profile; and Figure 7 is a perspective view of a modified form of cut-off device, which is preferably permanently installed on a lathe.

Referring now to the embodiment of the present invention which is shown in Figures 1–6, the cut-off tool 12 there illustrated is an accessory for use with various lathes. As shown in Figure 1, said tool 12 is held in a conventional tool post holder 14 of a lathe 16, so that the axis of said tool is aligned with the axis of the chuck 18 and a piece of material (which, in the illustration, is a cylindrical shaft 20) to be cut off extends through said tool 12.

The cut-off tool 12 includes a flat annular housing 22 and an elongated handle 24 which extends outwardly from the periphery of said annular housing at any convenient angle. In practice it has been found that the device will fit most lathes conveniently if the handle 24 is not exactly radially disposed, but is displaced laterally slightly from a radial position, as clearly shown in Figure 2. The housing 22 and handle 24 are actually made up of a base plate 26 and a cover plate 28, of like outline, which are held together by a number of machine screws 30.

Part of the inner face of the base plate 26 is depressed so as to accommodate a flat annular cam plate 32. In order to retain said cam plate 32 in a coaxial position, and allow it to rotate, an annular bearing flange 34 is provided at the inner periphery of the base plate 26, said flange being of a size to fit within the inner central circular aperture 36 of the cam plate 32. Said base plate 26 also has an arcuate rim flange 38 which extends through approximately 240° along its outer periphery, the other 120° being left open to accommodate a control lever 40 which extends outwardly radially from the edge of the cam plate 32.

The cam plate 32 fits into the depressed portion of the base plate 26 and is of slightly less thickness than the depth of said depression so that, when installed, it is slightly below the face of the arcuate rim flange 38 and the bearing flange 34. Said cam plate 32 is pierced by three duplicate cam slots 42, each of which has substantially the configuration of a portion of a spiral, coaxial with said plate, and which extends slightly less than 120° about said cam plate, the said three slots being equally spaced about said cam plate.

The cover plate 28 has the same general outline as the base plate 26, but its inner face is cut by three equally spaced guide grooves 44. It will be noted that one side 46 of each of the guide grooves 44 is radially disposed, and the other side is parallel thereto.

Positioned in each of the guide grooves 44 is a cutting blade 48 which is slidable longitudinally therein. Each cutting blade 48 is oblong in transverse cross section, being relatively wide and shallow. One of its wide faces is provided with a squat cylindrical cam follower pin 52 which, when the cut-off tool is assembled, fits slidably into one of the cam slots 42.

As may be seen in Figure 4, when the wide face of a cutting blade 48 is viewed, one end of the blade terminates in a hollow ground bevel, so that one side 54 is longer than the other side, the extremity of said longer side 54 forming the cutting edge 56 of the blade.

The cutting edges 56 may be shaped in any suitable manner, but preferably said cutting edges of the three cutting blades 48 are shaped to cut away different portions of the peripheral cut which is made in a piece of material 20 when it is cut off. Thus, as shown in Figure 6 (where the longer narrow sides 54 of the cutting blades 48 are toward the observer), the cutting edge 56a of one cutting blade 48 is angulated in one direction, the cutting edge 56b of another is angulated in the opposite direction and the cutting edge 56c of the third is perpendicular. In practice, the inner tip portion of each cutting blade 48, including its cutting edge 56, will preferably be an insert (not shown) of a particularly hard metal, so as to further reduce wear.

When the parts are assembled, the cover plate 28 is secured to the base plate 26 by the machine screws 30, the cam plate 32 being disposed within the annular depression of said base plate, the cutting blades 48 being disposed in the guide grooves 44 of said cover plate and the three cam follower pins 52 extending respectively into the three cam slots 42. The control lever 40 extends radially beyond the peripheries of the base plate 26 and cover plate 28, to allow manual or other manipulation of the tool. All of the parts should be well packed in grease.

Fastened to the outer peripheral surface of the base plate 26, alongside the path of operable movement of the control lever 40, is a curved scale plate 58 which is calibrated in linear units to indicate the distance that the cutting edges 56 are positioned outwardly from the axis of the tool, at any particular time. Said scale plate 58 is secured to the base plate 26 by a pair of screws 60 which extend through slots 62 in said scale plate, which slots are elongated to allow said scale plate to be adjusted as the cutting edges 56 wear down.

In the operation of the cut-off tool 12 just described (illustrated in Figures 1–6), said tool is positioned in a tool post holder 14, as indicated in Figure 1, the axis of the tool being aligned with the axis of the chuck 18 or other material holding means. The control lever 40 is in the position shown in Figure 3, so that the cutting blades 48 are fully retracted, and the material to be cut off (in this case, the shaft 20), extends axially through the central aperture of the tool.

The lathe is then operated so that said shaft 20 is caused to rotate, whereupon the control lever 40 is slowly swung along the scale plate 58 toward the position shown in Figure 4, so as to extend the cutting blades 48 toward the rotating shaft. When the cutting edges 56 begin to bite into the shaft 20 a peripheral groove is cut therein and, as the operation continues, said groove is continuously deepened until cut-off is fully accomplished.

The particular contours of the cutting edges 56, as shown in Figure 6, cause clean cuts to be made at both sides and also in the center of said cut-off groove. Thus the work of cutting is distributed among the three cutting edges 56 and, as a result, the life of each cutting edge is greatly lengthened.

As the three cutting blades 48 advance inwardly simultaneously from equally spaced positions about the periphery of the shaft 20, they act in a manner similar to a steady rest and prevent chattering or lateral strain of said shaft and, hence, the cutting edges 56 are not subjected to rapid wear which, in previous cut-off devices, ordinarily resulted from vibration during the cut-off operation.

It will be seen that the three cutting blades 48 are well supported by the guide grooves 44, the bearing flange 34 and the cam plate 32. As but a small portion of each cutting blade 48 extends into the central aperture of the housing 22 (Figure 4), said blades are supported quite close to their cutting edges 56 and hence practically no chatter can occur.

As may be seen in Figures 3 and 4, the relative positions of each cam slot 42 and its cam follower pin 52 are such that the outer edge of said slot engages with substantially the outermost point on the cam follower. Thus, when the cam plate 32 is rotated in the direction to move the blades 48 inwardly, each cam slot 42 exerts pressure upon its cam follower and likewise upon the cutting blade 48 so as to urge the cutting blade inwardly in a substantially longitudinal direction. This, of course, is parallel to the axial direction of the associated guide groove 44 and hence an absolute minimum of friction will occur between each blade and the sides of its guide groove. Because of this absolute minimum of friction and the mechanical advantage obtained by the design of the cam plate and cam slots, very little energy is needed in effecting cut-off.

The modified embodiment of the present invention, which is illustrated in Figure 7, is generally similar in structure and operation to that of the embodiment shown in Figures 1-6, except that actuation of the control lever is accomplished mechanically instead of manually and the device is provided with two supporting legs instead of a handle so that it may be permanently secured to the carriage of a lathe.

Thus the modified cut-off device 63 of Figure 7 includes a base plate 64 provided with two downwardly extending legs 66, the feet 68 of which are suitably shaped for attachment to the carriage 70 of a particular lathe 72.

The control lever 74 of said cut-off device 63 extends downwardly and the outer face of the base plate 64 is provided, adjacent said lever, with a flat arcuate scale plate 78 which is pierced by elongated arcuate adjusting slots to allow compensation for wear of the cutting blades 48.

The control lever 74 is bifurcated, the two prongs thereof straddling the outer end of a generally horizontally disposed finger 80 which is secured to the cross-feed 82 of the lathe 72. Said finger 80 is made up of two telescoping segments, so that it can be extended into operable engagement with the lever 74 during operation of the cut-off device 63, but may be retracted out of such engagement when it is desired to use the cross-feed 82 during other operations of the lathe.

This modified form of cut-off device 63 (Figure 7) preferably has a central opening 84 which is sufficiently large to allow substantially all pieces of material 20, which might be worked on, to pass through it. Thus, said cut-off device 63 may be left on the lathe 72 at all times and the material 20 may be worked on by other tools, such as a conventional cutting tool 86, which is held in the tool post holder 14 in the usual way. Then, said cut-off device 63 will move back and forth lengthwise of the lathe, with the carriage 70, during the performance of other lathe operations.

When the material 20 is to be cut off, the carriage 70 is moved lengthwise of the lathe until said cut-off device 63 is at the proper position to cut off said material. Then, the cross-feed 82 is adjusted laterally until the finger 80 may be extended to a position between the prongs of the control lever 74. Then, while the lathe 64 is rotating the material 20, the cross-feed 82 is moved laterally in the direction to swing the control lever 74 so as to advance the cutting blades 48 inwardly to cut off said material 20.

Although I have described two particular embodiments of the present invention, it will be understood that the principles of said invention will have broader application, in ways which will be evident to those skilled in the art.

What is claimed is:

1. A lathe including a chuck, a carriage movable toward and away from said chuck, a cross-feed movable transversely relative to said carriage, a cut-off tool sustained by said carriage and coaxial with said chuck, said cut-off tool comprising a plurality of cut-off blades movable in a plane substantially perpendicular to said axis and movable substantially simultaneously toward and away from said axis, means to move said blades inwardly substantially simultaneously, said means being actuated by the cross-feed.

2. A lathe as defined in claim 1, wherein said last named means includes a control lever on the cut-off tool and a finger secured to the said cross-feed which is releasably engageable with said control lever.

HAROLD L. HOFFMAN.

REFERENCES CITED

The following references are of record in the file of this patent:

UNITED STATES PATENTS

| Number | Name | Date |
| --- | --- | --- |
| 1,160,387 | Curtis | Nov. 16, 1915 |
| 1,695,363 | Causey et al. | Dec. 18, 1928 |
| 2,057,011 | Corwin | Oct. 13, 1936 |
| 2,326,463 | Johnston | Aug. 16, 1943 |